(12) United States Patent
Lich et al.

(10) Patent No.: US 7,822,517 B2
(45) Date of Patent: Oct. 26, 2010

(54) METHOD AND DEVICE FOR ACTIVATING ADDITIONAL FUNCTIONS IN RESPONSE TO A ROLLOVER PROCEDURE OF A MOTOR VEHICLE

(75) Inventors: Thomas Lich, Schwaikheim (DE); Michael Schmid, Kornwestheim (DE); Mario Kroeninger, Buehl (DE)

(73) Assignee: Robert Bosch GmbH, Stuttgart (DE)

(*) Notice: Subject to any disclaimer, the term of this patent is extended or adjusted under 35 U.S.C. 154(b) by 538 days.

(21) Appl. No.: 11/629,275

(22) PCT Filed: Apr. 11, 2005

(86) PCT No.: PCT/EP2005/051585

§ 371 (c)(1),
(2), (4) Date: Jan. 14, 2008

(87) PCT Pub. No.: WO2005/120904

PCT Pub. Date: Dec. 22, 2005

(65) Prior Publication Data

US 2008/0255717 A1  Oct. 16, 2008

(30) Foreign Application Priority Data

Jun. 9, 2004 (DE) ................... 10 2004 028 091

(51) Int. Cl.
*G01M 17/00* (2006.01)

(52) U.S. Cl. ............... 701/29; 701/33; 701/36; 701/45; 701/70; 701/220; 280/734

(58) Field of Classification Search ............... 701/29, 701/33, 35, 36, 45, 37, 38, 70, 220; 280/5.502, 280/734, 735
See application file for complete search history.

(56) References Cited

U.S. PATENT DOCUMENTS

| 7,239,949 B2* | 7/2007 | Lu et al. ............ 701/45 |
| 2003/0004627 A1* | 1/2003 | Williams et al. ............ 701/45 |
| 2006/0100781 A1* | 5/2006 | Lin et al. ............ 701/216 |

FOREIGN PATENT DOCUMENTS

DE  196 51 124  5/1998

(Continued)

*Primary Examiner*—Gertrude Arthur Jeanglaud
(74) *Attorney, Agent, or Firm*—Kenyon & Kenyon LLP

(57) ABSTRACT

A method for activating additional functions in response to a rollover procedure of a vehicle, using at least one sensor and one control unit, the sensor supplying at least one unidirectional acceleration signal, having the following method steps: analyzing at least one acceleration signal in its characteristics as a function of time; processing analyzed values of the at least one acceleration signal; establishing the plausibility of the processed values using a second signal value; and activating at least one additional function in response to a rollover procedure of the vehicle in the light of the values whose plausibility has been established; as well as a control device using this method.

18 Claims, 2 Drawing Sheets

FOREIGN PATENT DOCUMENTS

| | | |
|---|---|---|
| DE | 197 44 083 | 4/1999 |
| DE | 19744084 | 4/1999 |
| DE | 100 00 550 | 7/2001 |
| DE | 199 62 687 | 7/2001 |
| DE | 100 19 416 | 10/2001 |
| DE | 100 19 417 | 10/2001 |
| DE | 100 19 418 | 10/2001 |
| DE | 10019416 | 10/2001 |
| DE | 100 25 260 | 12/2001 |
| JP | 2001507656 | 6/2001 |
| JP | 2002286745 | 10/2002 |
| JP | 2002331041 | 11/2002 |
| JP | 2003531364 | 10/2003 |
| WO | WO0179036 | 10/2001 |
| WO | WO03081180 | 10/2003 |

\* cited by examiner

METHOD AND DEVICE FOR ACTIVATING ADDITIONAL FUNCTIONS IN RESPONSE TO A ROLLOVER PROCEDURE OF A MOTOR VEHICLE

FIELD OF THE INVENTION

The present invention relates to a method and a device for determining a rollover procedure of a vehicle, so as to activate additional functions.

BACKGROUND INFORMATION

The importance of passive safety in vehicle rollover procedures is very great, since a large proportion of fatal single vehicle accidents may be attributed to a turnover. In the overall occurrence of accidents, the turnover of vehicles or rollover procedures at this time occupy a proportion of about 20 percent.

Against this background, new concepts for rollover sensing have been developed, which are able to detect, for instance, a vehicle turnover already at an early point in time. This assures that safety devices such as belt tensioners, head air bags and rollover bars are activated at the right time, and that the risk of injury is decreased.

Documents German Published Patent Application No. 100 19 416, German Published Patent Application No. 100 19 417 and German Published Patent Application No. 100 19 418 describe methods and devices based on evaluating one rotation rate sensor and two acceleration sensors, that are situated in the central air bag control device. The rotation rate sensor ascertains the speed of rotation about the longitudinal axis of the vehicle, according to the gyroscopic principle; the acceleration sensors additionally measure the vehicle's acceleration in the transversal axis and the vertical axis of the vehicle. In the main algorithm, the rotation rate is evaluated. Using the measured values of the acceleration sensors, one may, on the one hand, recognize the kind of turnover, and, on the other hand, these values may be used for plausibility checks. If the rotation rate algorithm detects a turnover, safety measures are activated only by simultaneous release by the plausibility control.

An additional method for determining a rollover procedure, based on two linear acceleration sensors, may be seen in patent documents German Patent No. 196 51 124 and German Patent No. 199 62 687. An additional example for illustration is seen in German Published Patent Application No. 197 44 083, in which two independent decision criteria must be present in order for the signals from one rotation rate measuring device and two acceleration sensors lead to a triggering of a safety device.

In all patents and applications it is the aim to activate a triggering of restraint systems or safety systems, in response to a rollover procedure. Other applications are not known.

SUMMARY OF THE INVENTION

The method according to the present invention and the device according to the present invention for activating additional functions in response to a rollover procedure of a vehicle make it possible to sense a rollover procedure using at least one linear acceleration sensor, in order therewith to activate additional functions. This has the advantage of being able to use signals that are present to activate the additional functions.

The basic idea of the present invention will be explained in the following.

The crux of the present invention is the sensing of a rollover procedure using at least one linear acceleration sensor to control the additional functions, such as non-safety-critical additional functions. Thus, sensor signals already present in the vehicle may be used to activate additional functions, and have their plausibility checked for this.

If more than one acceleration sensor is used, a spatial separation of the sensors from each other is not required, which results in a space advantage and savings on the installation. With regard to the positioning of the sensors, they may have the same installation position, which has a clear advantage over existing methods, since approaches using linear accelerations to detect the respective roll rate or roll acceleration have to have a spatial separation.

One substantial advantage of the present invention is an increased use of functions having sensor systems that already exist or are present in the vehicle. The acceleration sensors in the lateral direction (y axis) of the vehicle that are present in the air bag control unit (y accelerations sensors and/or z acceleration sensors) or that are present in other control units, such as in the active driving dynamics, may be used for a simple rollover sensing. This being the case, a multiplicity of vehicles may be equipped with these possible additional functions. The additional functions include, among others: non-safety-critical systems, such as the release of the door lock automatic action, active interior trim molding, reversible means of restraint, such as seat belt tensioners, closing of windows and sliding roofs, active safety seat.

In the release of the door lock automatic action, the advantage comes about that safety personnel, fire fighters or other auxiliary service people reach the passengers as quickly as possible and without endangering them, or the passengers themselves are able to free themselves in a simple manner from the accident-stricken vehicle. For, the door locking is automatically activated, for example, if a vehicle is traveling at a certain minimum speed or if a switch in the passenger compartment is operated. In response to a turnover, then, this door-locking is automatically cancelled out.

The method according to the present invention, for activating additional functions during a rollover procedure of a vehicle, having at least one sensor and one control device, the sensor supplying at least one unidirectional acceleration signal, analyzes at least one acceleration signal as a function of time; processes the analyzed values of the at least one acceleration signal; establishes the plausibility of the processed values using a second signal value; and activates at least one additional function during a rollover procedure of the vehicle with the aid of the values that have had their plausibility checked.

Especial advantages come about in that, in the method step of analyzing, there is an integration of the acceleration signal, and the method step of processing has the following substeps: comparing integrated values of the acceleration signal to at least one specifiable threshold value; and the issuing of integrated values as a function of the comparison. Consequently, an acceleration signal is recognized as a function of a rollover procedure, and is distinguished from a signal of a different origin.

In a method step of establishing plausibility, this takes place using the values of the acceleration signal that was not processed, or of an independent acceleration signal of an additional sensor; and the emitting of a signal or data word after the successful establishment of plausibility is carried out. In this case, advantageously the acceleration signal that is present is evaluated twofold, and a second independent signal, that is perhaps already present, is used.

A broadened embodiment of the present invention provides that the method step of analyzing has the following sub-steps: comparing the acceleration signal to at least two second and third threshold values that are specifiable successively in time, and activating an additional analyzing as a function of time of the accelerations signal if there is a positive comparison result; and comparing the acceleration signal to a specifiable fourth threshold value and/or a model, and activating the next method step, in response to a positive comparison result. Thereby the sequence as a function of time of the acceleration signal is analyzed so as to distinguish it from short-time signals of other origins, and only the signal that is a function of the rollover procedure is passed on. In response to a further comparison to a fourth threshold value or a model, there also comes about an advantageous selection of the acceleration signal and of the gravitational acceleration component present in it, whose curve appears as a sine shape, and may be ascertained, for instance, by comparison to model curves. In that manner, then additional information concerning the rollover procedure is obtained in a simple way from the acceleration signal.

In this context, it is of advantage that the method step of processing has the following sub-steps: Integrating of values of the acceleration signal; and comparison of the integrated values to a specifiable first threshold value; simultaneous checking of the signal duration of the acceleration signal and comparing the signal duration to a specifiable fifth threshold value; and passing on the integrated signal values in response to positive comparison results from the two previous sub-steps.

A simultaneous comparing and logical linking brings about additional safety in the determination of the rollover procedure, this signal finally having its plausibility established in a method step of establishing plausibility, using a signal of vehicle speed that is already present in the vehicle.

Another specific embodiment of the present invention provides that the method step of analyzing simultaneously compares two present acceleration signals to, in each case, at least two second and third threshold values that are specifiable successively in time, and furthermore carries out an analysis over time of these two acceleration signals when there is a positive comparison result.

In this case it is particularly advantageous if the two independent acceleration signals are respectively signals of an acceleration in the direction of the lateral axis and of an acceleration in the direction of the vertical axis of the vehicle. These are then processed in parallel, as was described above, each compared to threshold values, and in the case of positive comparisons are linked to each other. Establishing the plausibility is done using the signal of the vehicle's speed. Consequently, the sine-shaped component of the gravitational acceleration is also advantageously utilized in the two acceleration signals, which are viewed over time. Using this specific embodiment, one may achieve a high activating performance of good quality for the sensing of rollover procedures, using linear acceleration sensors.

The specifiable threshold values and models are stored in a memory and are in each case specifiable and/or changeable, so that a great adaptation to different vehicle types is assured.

A device for activating additional functions in response to a rollover procedure of a vehicle, having at least one sensor and one control device, the sensor supplying at least one unidirectional acceleration signal, has the following: at least one device for analyzing at least one acceleration signal; at least one device for processing values of the at least one acceleration signal; a device for checking the plausibility of the processed values; a device for determining a rollover procedure of the vehicle and for activating additional functions that are not safety-relevant; and at least one storage device for storing data for specifiable threshold values and/or models.

In the preferred embodiment, the device for processing has an integrating device or a filter device for respectively one acceleration signal and respectively one first comparison device.

In one additional embodiment, the device for the analysis has a second comparison device for comparing the acceleration signal to two independent specifiable second and third threshold values, and a third comparison device having a specifiable fourth threshold value and/or specifiable model, the device for processing having additionally a device for checking the signal duration of each respective acceleration signal, and in each case a fourth comparison device and a device for the logical linking of the comparison results of the first and fourth comparison devices. It is advantageous that these devices are present in duplicate or even manifold, since this assures an especially flexible adaptation to different installation situations.

Furthermore, it is particularly advantageous that the sensor is designed as at least a bi-directional sensor, since consequently the installation of a spatially separated sensor or of a second sensor is not necessary.

The device is advantageously installed separately in a vehicle, or particularly advantageously as a component of, or assembly with a control unit that is already present, whereby a space saving comes about.

DETAILED DESCRIPTION

Figure 1:
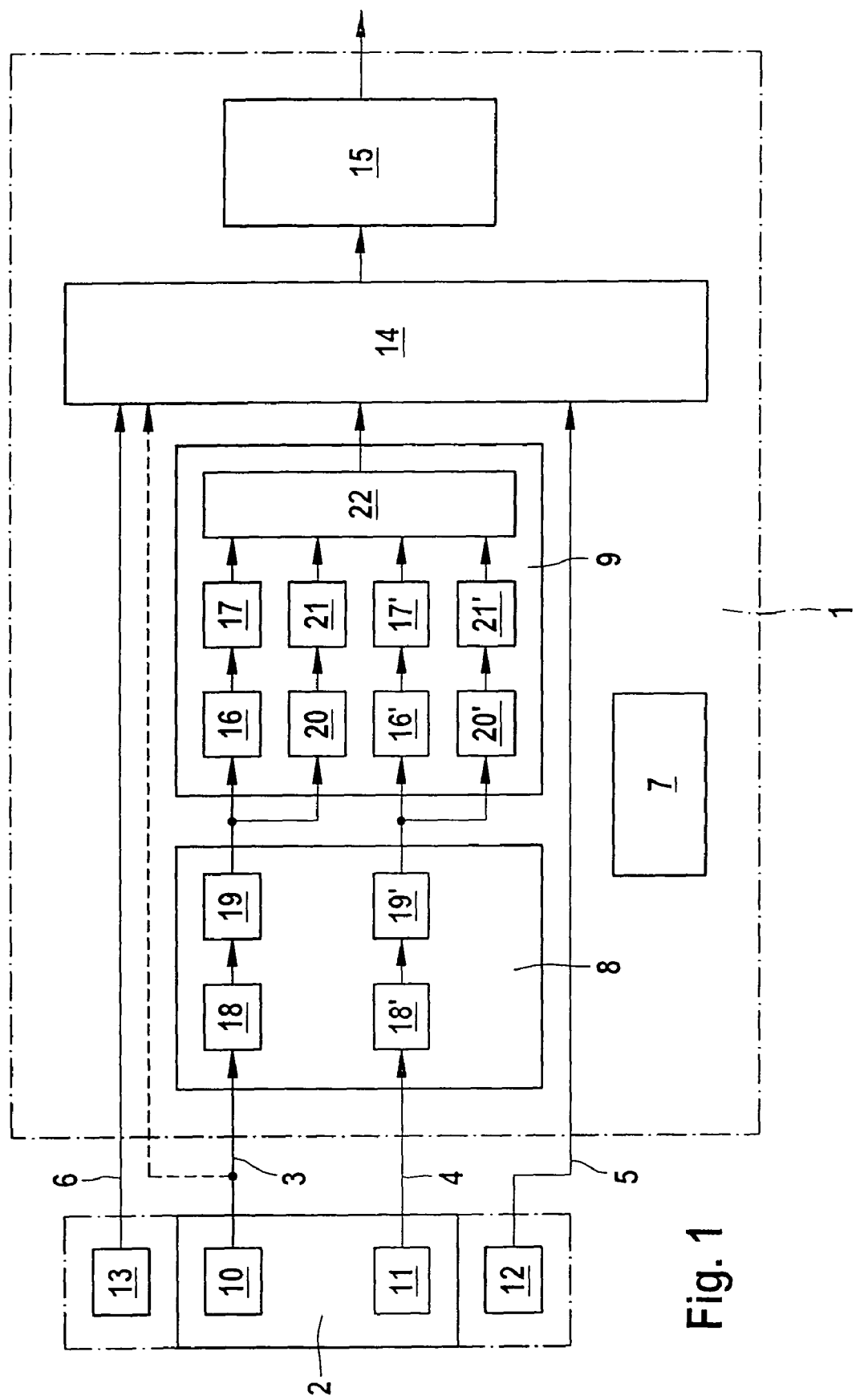
FIG. 1 shows a schematic representation of a specific embodiment of the method according to the present invention.

FIG. 1 shows schematically, in exemplary fashion, a specific embodiment of the method according to the present invention for activating additional functions in response to a rollover procedure of a vehicle.

By the term additional functions is meant, for example, non-safety critical systems, such as the release of door lock automatic action, active interior trim molding, reversible means of restraint, such as belt tensioners, the closing of windows and sliding roofs, active safety seat and the like.

Figure 2:
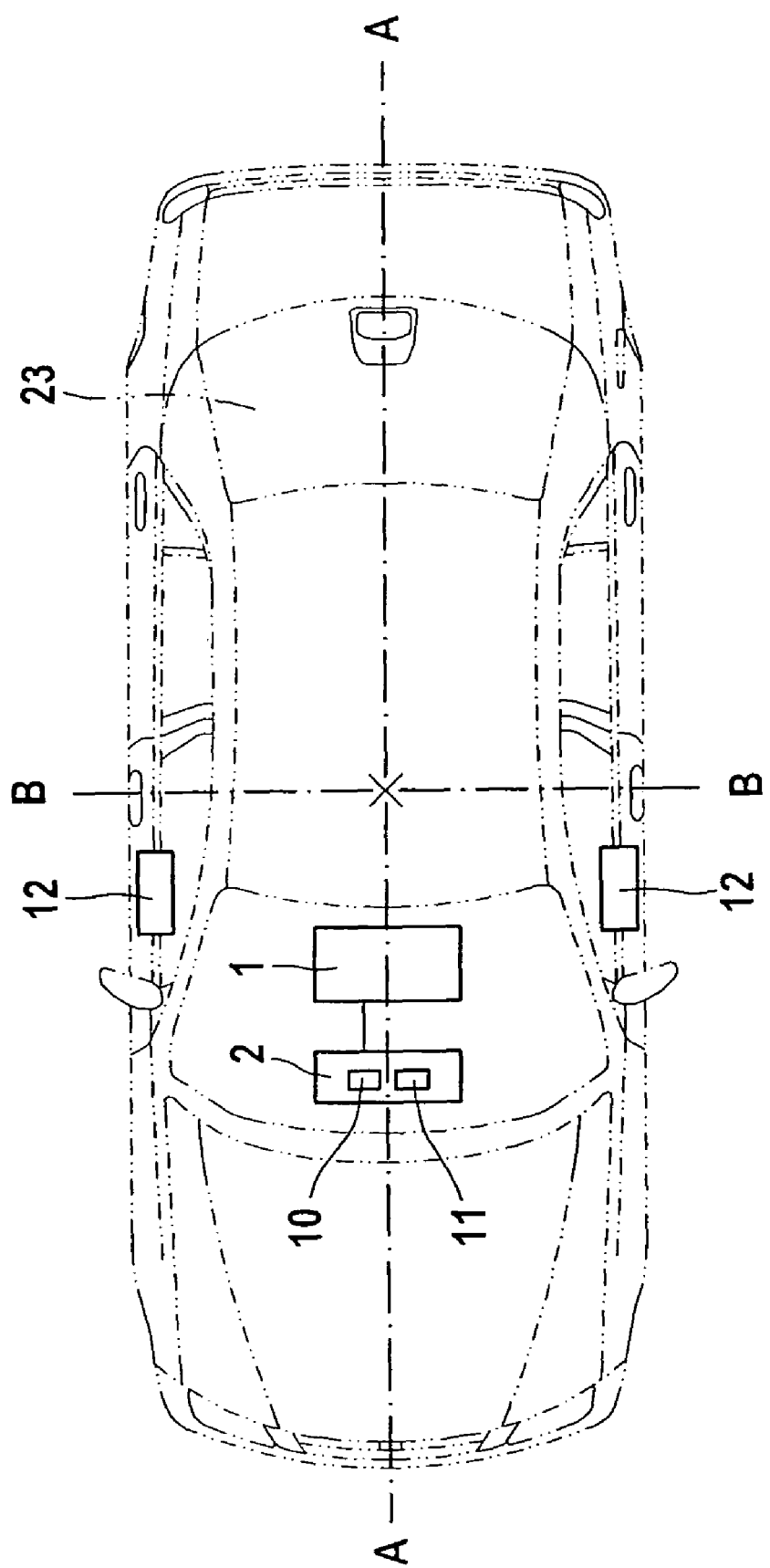
FIG. 2 shows a block diagram of a specific embodiment of the device according to the present invention.

In this illustration, three exemplary implementations are shown of the method for activating additional functions during a rollover procedure, using a threshold value comparison of a vehicle 23, in summary, which are explained one after another in connection with FIG. 2, which shows an exemplary block diagram of a device according to the present invention for the method according to the present invention.

There is described, first of all, a first exemplary embodiment for the detection of a rollover procedure, using a threshold comparison, signals being used that are already present in a control unit in vehicle 23, for example, as an air bag control unit that is already present having a sensor system that is already present for a simple rollover sensing.

A control unit is designated by reference numeral 2, for instance, a control unit for sensing a lateral impact, and it has at least a first sensor 10 that supplies a first acceleration signal 3, that occurs also in the case of a rollover procedure, especially in the case of an appearance of the vehicle at 90° and 180° on one side. This means that vehicle 23 rotates by these angles about a longitudinal axis that is designated by A-A in FIG. 2.

The functioning of acceleration sensors and their generation of signals is known, and will not be described further.

First acceleration signal 3, in this case, is the lateral acceleration in the direction of a lateral axis B-B to longitudinal axis A-A of vehicle 23. First acceleration signal 3 is analyzed as a function of time in a first method step S 1 in a device 8 for analysis, in such a way that the signal is observed with regard to its curve over time. This observation may be carried out in this case in the most simple manner by passing on the signal. It is also possible, in this instance, to differentiate the signal from short-time interferences by determining the extension in time of the signal, as is explained below.

First acceleration signal 3 is then processed in a further method step S2, which takes place in a device 9 for processing, preferably by integrating in an integration device 16. Thereafter, the integrated signal is compared, in a first comparison device, to at least one specifiable threshold value in a sub-step S2-1. this specifiable threshold value is preferably stored in a memory 7. It may also be looked up, depending on the vehicle, in a table present in the memory.

If it turns out in these comparisons that the integrated signal of first acceleration signal 3 attains or exceeds the specifiable threshold value, it is output in an additional sub-step S2-2, and its plausibility is established using an additional signal. This additional signal, in this first example, in the simplest embodiment is first acceleration signal 3, which is used unprocessed. This signal curve is represented in FIG. 1 by a broken line. If, perhaps, an additional sensor is present, for instance, a third sensor 12 that is situated outside control unit 2, for example, a so-called PAS sensor (peripheral acceleration system), its signal may be used as an independent acceleration signal 5 to establish plausibility in a method step S3 in a device 14 for establishing plausibility of first acceleration signal 3.

Establishing plausibility takes place in a known manner in a sub-step S3-1, and will not be explained further. If integrated first acceleration signal 3 has its plausibility successfully established as a signal of a rollover procedure of vehicle 23, a device 15 for determination emits a signal or data word in a sub-step S3-2, which may be used to activate additional functions.

In the second exemplary embodiment, monitoring of a component of the gravitational acceleration is undertaken in a lateral acceleration signal, establishing plausibility being carried out using the vehicle speed.

In the case in which vehicle 23, in response to the turnover, is in a free fall, and comes to rest on its roof, or rolls off into relatively soft ground, the accelerations that occur are less than in the first exemplary embodiment, so that the range of a turnover angle about 180°±30° and the so-called "soft breakaways" may be checked by an additional function. In this connection, the important measure is the gravitational acceleration, which, in the case of a rollover procedure by 90° has to be measured by the y component, that is, in the direction of the transverse axis B-B in FIG. 2, of acceleration signal 3. Since, in this case, the rollover procedure with respect to a lateral impact, a so-called "side crash", lasts a long time, it is possible, in this case, to have a view in time or an observation of the acceleration in the direction of the transverse axis B-B of vehicle 23. In response to a position of vehicle 23 on its side, that is, at a rollover angle of 90°, transverse axis B-B stands vertically in the direction of the gravitational acceleration. Consequently, in this position, there comes about the greatest value of gravitational acceleration in the lateral acceleration signal. The acceleration is effective relatively long and constantly. It may be algorithmically recorded and evaluated by an evaluation logic. Likewise, one may also use an acceleration sensor that is situated in the direction of the vertical axis of vehicle 23, such as in the z component. In this context, in the side position, 90°, the acceleration due to gravity does not appear, and has been shifted by 90° to the acceleration signal in the y component.

In order to delimit this function from so-called "misuse" situations, which are, for instance, signals that come about, for example, because of short impacts on vehicle 23, and do not correspond to a rollover procedure, vehicle speed is drawn upon, in addition. Consequently, one advantageously obtains an additional improvement, having, however, to make sure that misuse situations are able to be clearly distinguished from rollover procedures, which may be done, for example, by making a comparison of the acceleration signal to a model.

For this second exemplary embodiment, in method step S1, in a sub-step S1-1, acceleration signal 3 is analyzed together with two temporally successive, specifiable second and third threshold values in a first comparison device 18 of analysis device 8 in such a way that the curve over time of the gravitational acceleration is observed, which generates a sinus-shaped curve in the acceleration signal. At this point, one may also make a comparison to a curve sequence model.

If, in this observation over time, the gravitational acceleration in the curve that is characteristic for a rollover procedure is established, a further analysis of acceleration signal 3 is started.

This additional analysis takes place in a sub-step S1-2, in that acceleration signal 3 is now compared to a fourth specifiable threshold value and/or a model in a third comparison device 19. In response to a successful comparison, that is, that the threshold value is reached or exceeded, the next method step S2, processing, takes place, in which, in a sub-step S2-1, acceleration signal 3 is integrated in an integration direction 16, and is compared to a first specifiable threshold value in a first comparison direction 17. It is also possible to use for this a low-frequency filtering or a concurrent counter. At the same time, in a parallel running sub-step S2-2, the duration of the acceleration signal is checked in a device 20 for checking and comparing to a specifiable fifth threshold value in a fourth comparison device 21.

The checking takes place, for example, using a concurrent counter that ascertains the time in which the acceleration signal is present. Thus, misuses may advantageously be recognized, since their characteristic signal images are present only for a short period of time. It is also possible to use a low-frequency filtering or a concurrent counter.

In a sub-step S2-3 there takes place, using a device 22 for logical linking, the passing on of the integrated signal values, in response in each case to positive comparison results from sub-steps S2-1 and S2-2.

In device 14 for establishing plausibility, there then takes place a plausibility check in a sub-step S3-1, using a signal 6 of the vehicle's speed, which in vehicle 23 is supplied, for instance, by a known CAN bus or a separate fourth sensor 13. The additional sequence after a successful plausibility check has been described above, in the first example.

In the third exemplary embodiment there takes place a broadening of the method described in the second exemplary embodiment, whereby the latter achieves a great activation effectiveness of high quality.

Since, in the case of a rotation of 360° (for instance, a so-called "corkscrew" in the rollover procedure), the first two functions, depending on the sequence in time, are not able to produce any activation, a broadening of the method is undertaken in that an acceleration signal 4 from a second sensor 11, in the direction of the vertical axis, that is, the z axis of vehicle 23, is also included. If, for example, vehicle 23 has two sensors which are aligned both in the transverse axis B-B and the vertical axis of vehicle 23, a function may also be implemented, by monitoring of the gravitational acceleration, which maintains its function even in a complete rotation of vehicle 23 during a rollover procedure.

In a rotation of 360°, second acceleration sensor 11, in the direction of the vertical axis of vehicle 23, has to measure, at least for some time, a negative gravitational acceleration. This then states that vehicle 23 has completed one rotation.

The difference from the second exemplary embodiment is that now two accelerations signals 3 and 4 are submitted at the same time to the same method steps:

In a sub-step S1-1, two acceleration signals 3 and 4 are analyzed with, in each case, two specifiable second and third threshold values, that are successive in time, in first comparison devices 18, 18' of device 8 in such a way that the curve over time of the gravitational acceleration is observed, which generates a sine-shaped curve in the acceleration signal. At this point, one may also make a comparison to a curve sequence model.

If, in this observation over time, the gravitational acceleration in the curve that is characteristic for a rollover procedure is established in both acceleration signals 3 and 4, a further analysis of acceleration signals 3 and 4 is started.

This further analysis takes place in sub-step S1-2 in that acceleration signals 3 and 4 are now in each case compared to a fourth specifiable threshold value and/or a model in third comparison device 19, 19'. In response to a successful comparison, that is, that the respective threshold value is reached or exceeded, the next method step S2, processing, takes place, in which, in a sub-step S2-1, acceleration signals 3 and 4 are integrated in integration directions 16, 16' and are compared in each case to a first specifiable threshold value in first comparison directions 17, 17'. At the same time, in a parallel running sub-step S2-2, the duration of the acceleration signal is checked in devices 20, 20' for checking and comparing to respectively a specifiable fifth threshold value in a fourth comparison devices 21, 21'.

The checking takes place as was described in the second exemplary embodiment. The values of acceleration signals 3 and 4 should, however, fit together within the scope of certain acceleration influences that originate with the remaining motion of vehicle 23.

In a sub-step S2-3 there takes place, using a device 22 for logical linking, the passing on of the integrated signal values, in response in each case to positive comparison results from sub-steps S2-1 and S2-2.

In device 14 for checking plausibility, there then takes place a plausibility check as was described in the second exemplary embodiment.

All the threshold values are specifiable, and may be stored in memory device 7. However, they may also have models or curve types, for instance, in the form of tables.

FIG. 2 shows an exemplary situation of a device according to the present invention in a vehicle 23, along with its longitudinal axis A-A and its transverse axis B-B. Longitudinal axis A-A is also known as the x axis, and lateral axis B-B as the y axis. The vertical axis of vehicle 23 is perpendicular to the plane of the drawing, and is also designated as the z axis.

In this specific embodiment, control unit 2 has a first sensor 10 and a second sensor 11, each ascertaining the accelerations in axes that are orthogonal to each other, such as y axis and x axis. Both sensors 10 and 11 may also be designed as so-called "bidirectional" sensors.

Third sensors 12 are located in the side of vehicle 23 as so-called "side crash sensors".

Device 1 according to the present invention is here situated separately. However, it may also be a component of control unit 2.

The present invention is not limited to the exemplary embodiments described above, but is modifiable in a variety of ways.

Thus, it is conceivable, for example, that not only additional functions are activated that are not safety-relevant, but that activation is also possible of safety-relevant functions, for instance, in a minimal configuration, whereby an additional protective function is made possible in a simple but safe manner.

What is claimed is:

1. A method for activating additional functions in response to a rollover procedure of a vehicle, using at least one sensor and one control unit, the sensor supplying at least one unidirectional acceleration signal, the method comprising:
   (S1) analyzing at least one acceleration signal in its characteristics as a function of time, so as to provide analyzed values;
   (S2) processing the analyzed values of the at least one acceleration signal;
   (S3) establishing the plausibility of the processed values using a second signal value; and
   (S4) activating at least one additional non-safety-critical function in response to a rollover procedure of the vehicle in the light of the values whose plausibility has been established.

2. The method as recited in claim 1, wherein in method step (S2) the acceleration signal is integrated, providing integrated values, and the method step (S2) has the following additional sub-steps:
   (S2-1) comparing the integrated values of the acceleration signal (3, 4) to at least one specifiable threshold value; and
   (S2-2) outputting the integrated values as a function of the comparison.

3. The method as recited in claim 2, wherein the method step (S3) has the following sub-steps:
   (S3-1) establishing the plausibility of the values output in sub-step (S2-2) using a non-processed acceleration signal or an independent acceleration signal of an additional sensor; and
   (S3-2) outputting a signal or a data word after successfully establishing the plausibility.

4. The method as recited in claim 1, wherein the method step (Si) has the following sub-steps:
   (S1-1) comparing the acceleration signal with at least two temporally successive, specifiable second and third threshold values, and activating an additional analyzing over time of the acceleration signal in response to a positive comparison result; and
   (S1-2) comparing the acceleration signal to at least one of a specifiable fourth threshold value and a model, and activating the next method step in response to a positive comparison result.

5. The method as recited in claim 4, wherein the method step (S2) has the following sub-steps:
   (S2-1) integrating of values of the acceleration signal; and comparing the integrated values to a specifiable first threshold value;
   (S2-2) simultaneous checking of the signal duration of the acceleration signal and comparing the signal duration to a specifiable fifth threshold value; and (S2-3) passing on the integrated signal values, in response to positive comparison results, from the two sub-steps (S2-1) and (S2-2).

6. The method as recited in claim 5, wherein the method step (S3) has the following sub-steps:
(S3-1) establishing the plausibility of the values output in sub-step (S2-3) using a signal of a vehicle's speed; and
(S3-2) outputting a signal or a data word after successfully establishing the plausibility.

7. The method as recited in claim 1, wherein the method step (S1) has the following sub-steps:
(S1-1) comparing two independent acceleration signals to respectively at least two temporally successive, specifiable second and third threshold values, and activating an additional analyzing over time of these acceleration signals in response to a positive comparison result; and
(S1-2) comparing these acceleration signals respectively to at least one of a specifiable fourth threshold value and a model, and activating the next method step in response to a positive comparison result.

8. The method as recited in claim 7, wherein the two independent acceleration signals are in each case signals of an acceleration in a direction of the transverse axis and an acceleration in the direction of the vertical axis of the vehicle.

9. The method as recited in claim 8, wherein the method step (S2) has the following sub-steps:
(S2-1) integrating of values of the acceleration signals; and comparing the integrated values respectively to a specifiable first threshold value;
(S2-2) simultaneous checking of the signal duration of both the acceleration signals and comparing a signal duration respectively to a specifiable fifth threshold value; and
(S2-3) passing on the integrated signal values, in response to positive comparison results, from the two sub-steps (S2-1) and (S2-2).

10. The method as recited in claim 9, wherein the method step (S3) has the following sub-steps:
(S3-1) establishing the plausibility of the values output in sub-step (S2-3) using a signal of a vehicle's speed; and
(S3-2) outputting a signal or a data word after successfully establishing the plausibility.

11. The method as recited in claim 2, wherein the at least one specifiable threshold value includes specifiable threshold values, and wherein models and the specifiable threshold values are stored in a memory device.

12. The method as recited in claim 1, wherein the non-safety-critical function includes at least one of releasing a door lock, activating interior trim molding, reversing means of restraint, closing of windows, closing of a sliding roof, tensioning seat belts, and activating a safety seat.

13. A device for activating additional non-safety-critical functions in response to a rollover procedure of a vehicle, using at least one sensor and one control unit, the sensor supplying at least one unidirectional acceleration signal, the device comprising:
at least one device for analyzing at least one acceleration signal;
at least one device for processing values of the at least one acceleration signal;
a device for establishing the plausibility of the processed values;
a device for determining a rollover procedure of the vehicle and for activating additional functions that are not safety-relevant; and
at least one memory device for storing data for at least one of specifiable threshold values and models.

14. The method as recited in claim 13, wherein the device for processing has an integration device or a filter device for respectively an acceleration signal and respectively a first comparison device.

15. The method as recited in claim 14, wherein the device for the analysis has a second comparison device for comparing the acceleration signal to two independent, specifiable second and third threshold values, and a third comparison device having at least one of a specifiable fourth threshold value and a specifiable model, the device for processing additionally having a device for checking a signal duration of respectively an acceleration signal and respectively a fourth comparison device, and a device for logically linking comparison results of the first and the fourth comparison devices.

16. The device as recited in claim 13, wherein the sensor is designed at least as a bidirectional sensor.

17. The device as recited in claim 16, wherein all devices of the device are situated centrally in the control unit or separately in the vehicle.

18. The device as recited in claim 13, wherein the non-safety-critical function includes at least one of releasing a door lock, activating interior trim molding, reversing means of restraint, closing of windows, closing of a sliding roof, tensioning seat belts, and activating a safety seat.

* * * * *